United States Patent [19]

Nguyen

[11] Patent Number: 5,761,445
[45] Date of Patent: Jun. 2, 1998

[54] DUAL DOMAIN DATA PROCESSING NETWORK WITH CROSS-LINKING DATA QUEUES AND SELECTIVE PRIORITY ARBITRATION LOGIC

[75] Inventor: Bich Ngoc Nguyen, Fountain Valley, Calif.

[73] Assignee: Unisys Corporation, Blue Bell, Pa.

[21] Appl. No.: 638,247

[22] Filed: Apr. 26, 1996

[51] Int. Cl.⁶ .................................................. G06F 11/20
[52] U.S. Cl. ........................ 395/280; 395/293; 395/729
[58] Field of Search .................................. 395/280, 281, 395/287, 288, 291, 293–298, 728, 729, 731, 732, 473

[56] References Cited

U.S. PATENT DOCUMENTS 5,446,848   8/1995   Whitlock et al. ................. 395/280
5,495,585   2/1996   Datwyler et al. ................. 395/280
5,581,782  12/1996   Sarangdhar et al. .............. 395/800

*Primary Examiner*—Jack B. Harvey
*Assistant Examiner*—Jigar Pancholi
*Attorney, Agent, or Firm*—Alfred W. Kozak; Mark T. Starr; Steven R. Petersen

[57] ABSTRACT

A two domain network linking a first and second data processing system enables efficient data transfers between modules in the first system and modules in the second system through linkage by bus exchange modules having message queues and snoop-write address queues in each domain. Each system also allocates bus access using a selectively adjusting bus access priority arbitration logic unit. The Snoop-Write address queues in each bus exchange module can temporarily hold a sequence of Write OP addresses snooped from one domain for invalidation in another domain without requiring the bus exchange module to dominate its access priority over other requesting modules.

13 Claims, 6 Drawing Sheets

DUAL DOMAIN DATA PROCESSING NETWORK WITH CROSS-LINKING DATA QUEUES AND SELECTIVE PRIORITY ARBITRATION LOGIC

FIELD OF THE INVENTION

This disclosure relates to data transfer operations between cross-coupled digital systems having selectively activated arbitration logic for determining priority of access to a common system bus during various conditions of connected multiple requesting modules.

CROSS-REFERENCES TO RELATED APPLICATIONS

The system of the present disclosure is related to a patent and earlier filed applications which are included by reference. These include: U.S. Pat. No. 5,446,848 entitled "Entry Level Data Processing System which is Expandable by a Factor of Two to a Partitionable Upgraded System with Low Overhead"; U.S. Ser. No. 08/443,973 entitled "Arbitration System for Bus Requestors With Deadlock Prevention"; and U.S. Ser. No. 08/443,974 entitled "Dual Coupled Partitionable Networks Providing Arbitration Logic for Managed Access to Commonly Shared Busses".

BACKGROUND OF THE INVENTION

There are a number of technological developments in the existing art which involve the establishment of the priority of access to the system bus in computer systems. For example, U.S. Pat. No. 4,009,470 (Danilenko) entitled "Pre-Emptive, Rotational Priority System Establishes Different Modes of Priority Which Preempt Lower Order Requesters When a Higher Order Requester Requests Service". This system pre-empts (owner-ordered) requesters when a higher order requester requests bus access.

The Malmquist U.S. Pat. No. 4,760,515 entitled "Arbitration Apparatus for Determining Priority of Access to a Shared Bus on a Rotating Priority Basis" involves a rotating priority algorithm used to prevent bus lock-out due to usage of a fixed priority scheme.

Another type of priority arrangement is indicated in U.S. Pat. No. 4,953,081 (BEAL) entitled "Least Recently Used Arbiter With Programmable High Priority Mode and Performance Monitor". This system uses a least recently used module to rotate the priority among requesters that are requesting resources simultaneously. This not only requires very costly circuitry, but the arrangement can still result in bus lockout if a higher priority class device consistently requests the bus.

Another priority scheme is disclosed in U.S. Pat. No. 5,160,923 to Sugawara entitled "Priority Encoder For Resolving Priority Contention". This patent uses a system combining a rotating priority scheme and a fixed priority scheme. However, an extreme problem of bus latency can occur with the usage of this type of system.

U.S. Pat. No. 5,051,946 to Cubranich is entitled "Integrated Scanable Rotational Priority Network Apparatus". This is primarily a preemptive priority system combined with a secondary integrated rotational priority system. However, this type of system does not resolve the problems which will be indicated in the presently disclosed network.

Another priority system is provided in U.S. Pat. No. 5,241,632, (O'Connell) entitled "Programmable Priority Arbiter". This system incorporates features of several different arbitration schemes which include a straight priority scheme, a programmable arbitration and a rotatable priority arbitration. However, this system does not cope with and solve the "deadlock" problem in the hereinafter described architecture when two devices are waiting on each other for resource data. Further, the O'Connell reference could not be applied to the presently described computer network.

The presently described network and arbitration system is tailored to and applied to a specific type of computer network where a number of unusual problems arise. The present invention handles the case when a request for access to the system bus is already granted, but access to the actual target receiving device involved is denied, whereupon the arbiter will taken into account the fact that the last request is retried and will grant bus access to the same requester a pre-determined number of times before it allows a rotational priority operation to go to another requester. This has the advantage of preventing deadlock from occurring when two requesters are waiting for information messages or data from each other. Most rotating priority schemes will not handle this and will not prevent a system crashdown.

Further, the presently described network will function to prevent lockout of a lower priority requester by switching from a fixed priority mode to a dynamic priority mode such as a first-come, first-served scheme and vice-versa. This eliminates bus latency that many systems are incapable of coping with. Further, the present system will handle the deadlock problem in the herein described architecture when two devices are simultaneously waiting on each other for the exchange of messages, information or other resource data.

In the presently described cross-linked network the arbitration algorithm will keep granting system bus access to the module that is last retried a predetermined number of times, that is to say, it will allocate extra bus bandwidth if the requester module got retried, before it will provide a rotating priority to the other device operating at that same level of priority. The present arbitration algorithm is considerably flexible in that it can use a first-come, first-serve operation to a requester, or it can at certain times provide a fixed priority, and at other times provide a rotating priority, while under certain conditions, it can provide, on retry situations, extra bandwidth allocation for access to the bus when certain error conditions occur, and further will operate to prevent a lockout condition which could occur when heavy traffic is attempting to move from one domain to the other.

SUMMARY OF THE INVENTION

A self-adjusting arbitration system is provided to a network of two coupled processing systems involving the cross-linking of a first domain and second domain, where each domain has a commonly shared system bus. The major requesters connected to the bus involve a first and second Central Processing Module, a first and second Input/Output Module and a first and second Bus Exchange Module (BEM).

When two or more requesters request access service to the common bus simultaneously, the present system and method use a fixed priority algorithm. In the fixed priority algorithm, a high-ordered priority requester (such as the BEM) can lock out lower priority-ordered requesters for an indefinite period of time. In this situation, the present method reverts to the simple non-preemptive, first-come, first-served algorithm to solve the access priority problem.

The BEM of each domain provides a Message Queue and a Write OP address queue which enables messages and write addresses from one domain to be transmitted to the other domain when bus access is available.

The present cross-link network and algorithmic method also looks at the case when request for access to the system bus is already granted, but access to the actual receiving module is denied. In this case, the arbitration method will take into account the fact that the last request was "retried" and will grant bus access to the same requester a predetermined number of times before going into a rotating priority method for other requesters. This arrangement has the advantage of preventing deadlock from occurring when two requesters are waiting on each other for exchange of resource data.

The present cross-link network and algorithmic method is efficiently applicable to a system having a very high bus utilization and overcomes the problem which can often occur in systems using a higher priority class module which consistently requests the bus and which can result in a bus lockout. Further, the present algorithmic method operates to prevent the lockout of a lower priority requester by switching from a fixed priority mode to a dynamic priority mode, such as a first-come, first-served mode. Likewise, the present system may operate vice-versa by switching from the first-come, first-served dynamic priority mode to a fixed priority mode which will also prevent lockout.

The self-adjusting and alternating modes of priority implementation operate to cross-couple dual domain processing systems each using a common system bus and also renders use of the architecture in a fashion so as not to crash the system by locking up operations.

Thus, the presently described network and algorithmic method will sometimes operate in the first-come, first-served mode or when needed into a fixed priority mode or in other situations the arbitration will work on rotating priority basis, while sometime the arbiter involved will stop all arbitration to prevent lockout. Additionally, a bandwidth allocation is provided where multiple retry operations will be given to the same requester for bus access when an error condition occurs, thus enabling completion of a data transfer cycle.

DESCRIPTION OF PREFERRED EMBODIMENT

As will be indicated hereinafter, a number of problems and operational situations occur in the usage of a computer network when data communications and transfer of data are required on the system bus. The circuitry shown in the attached FIG. 3 will illustrate the basic architecture of the system and the type of problems and inter-relationships involved.

Figure 3:
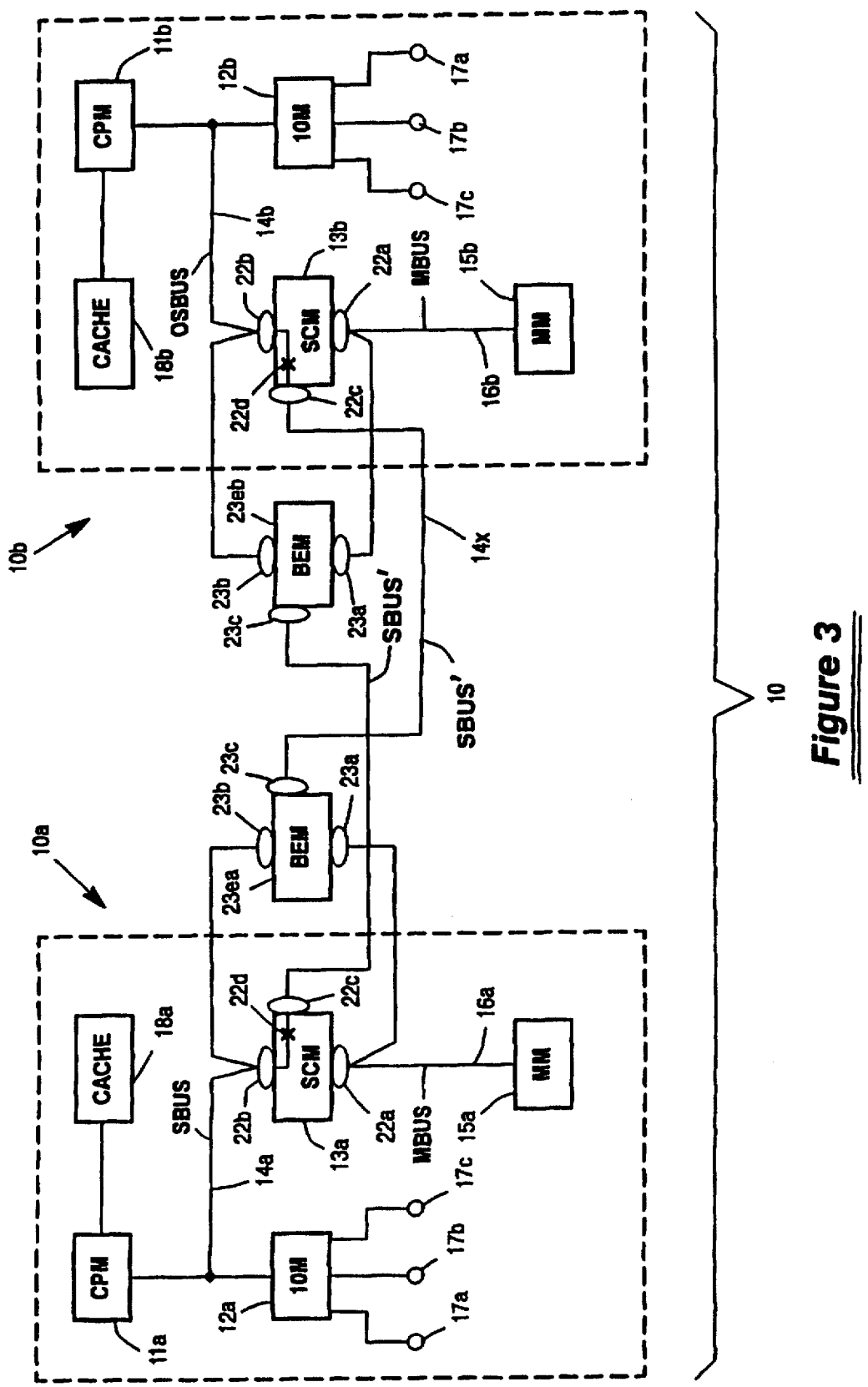
FIG. 3 is detailed network diagram of the dual computer systems to which the arbitration algorithm is applied.

FIG. 3 is an illustration of a network which involves two inter-related data processing systems. The data processing system 10 can be illustrated in two duplicated domain areas as local system domain 10a and remote system domain 10b.

Figure 2:
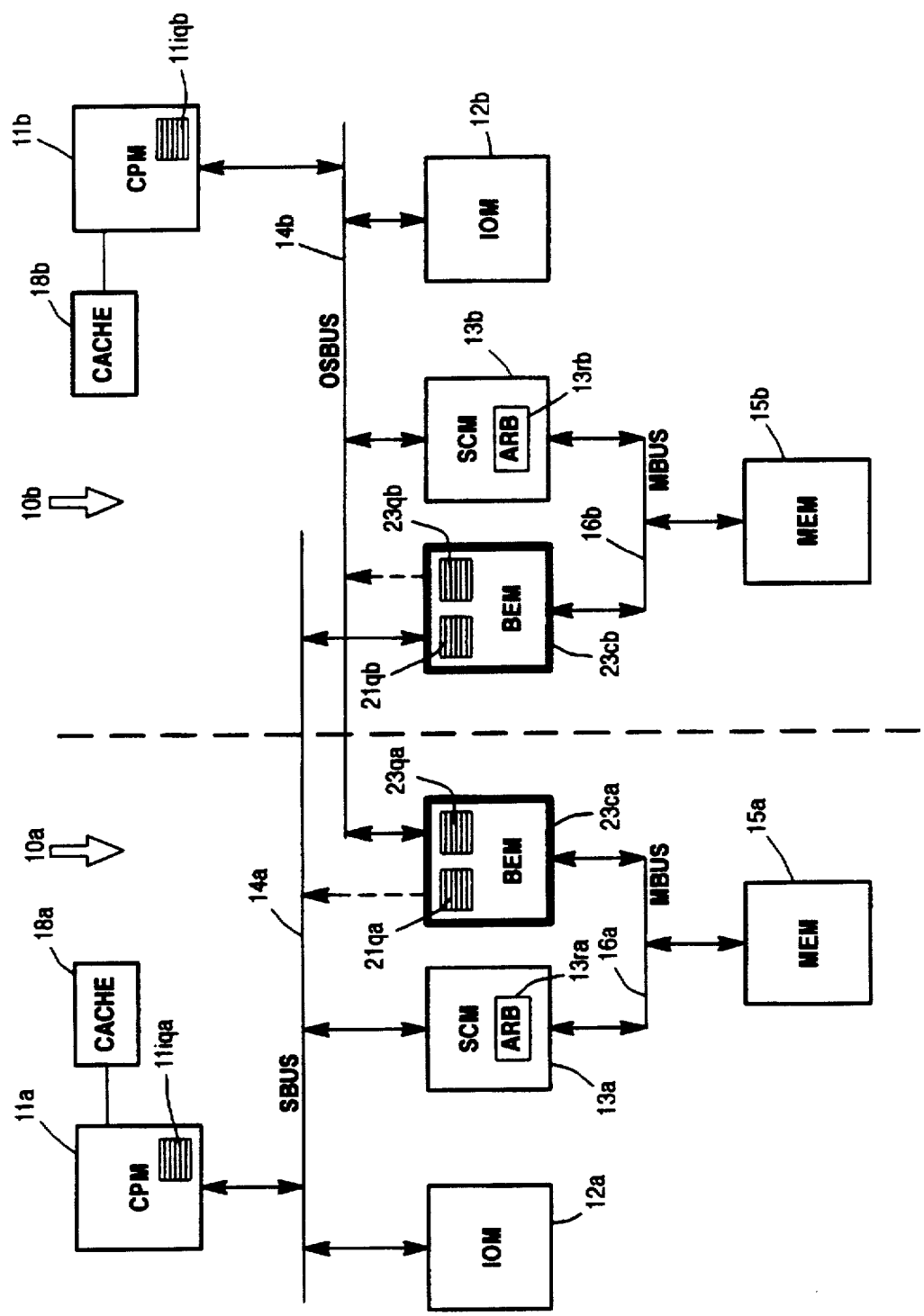
FIG. 2 is a simplified diagram which indicates the requesters which seek access to the common system bus.

In a generalized view of FIG. 2, the data processing system 10 includes a Central Processing Module (CPM) 11, an Input/Output Module (IOM) 12 and a System Control Module (SCM) 13, all of which are intercoupled and communicate with each other over a System Bus (SBUS) 14. Also included in the data processing system 10 is a Memory Module (MM) 15, which is coupled to the System Control Module 13 via a Memory Bus (MBUS 16). Each of the busses 14 and 16 include an arbiter 13r in SCM 13 by which the use of the busses is time-shared. FIG. 2 also indicates two linked data processing systems 10a and 10b. Each system has a Bus Exchange Module BEM 23e which links the bus 14a in system domain 10a to bus 14b in domain 10b.

For brevity, the two CPMs 11a, 11b, the IOMs 12a, 12b and BEMs 23ea, 23eb will sometimes be generically referred to as CPM 11, IOM 12 and BEM 23e.

The data processing system 10 of FIG. 3 (which encompasses 10a and 10b) includes several Input/Output devices 17, such as disk 17a, a keyboard 17b, and a Cathode Ray Tube (CRT) screen 17c, which are coupled to the Input/Output Module 12 and a cache unit 18 which is coupled to the Central Processing Module 11.

Operationally, the entry-level system 10 processes data in the following sequence. Firstly, a software program is transferred from the disk 17a to the Memory Module 15 via the elements 12, 14, 13, and 16. Thereafter, portions of the program are read, by the Central Processing Module 11, from the Memory Module 15 and stored in the cache memory 18 via the elements of Memory Bus 16, SCM 13, and bus 14. After this, program instructions in the cache 18 are executed, one at a time, by the Central Processing Module 11.

Some instructions selectively transfer data from the disk 17a or keyboard 17b to the Memory Module 15 or to the cache 18. Other instructions will specify various operations for the Central Processing Module 11 to perform on the data in the cache 18 or in the memory 15, while other instructions may send the results from the Central Processing Module 11 to the disk 17a for storage or to the Cathode Ray Tube screen 17c for display.

The data processing system 10 includes a system expansion interface 22 by which the system 10 can be expanded to a dual data processing system as seen in FIG. 2 and FIG. 3. The system expansion interface 22 in FIG. 3 includes a memory bus expansion port 22a, first and second system bus expansion ports 22b and 22c and an extension of the System Bus (SBUS) through a switch 22d on the SCM module 13.

Port 22a consists of a connector for externally connecting to and communicating with the memory bus 16; port 22b consist of a connector for externally connecting to and communicating with the system bus 14; port 22c (of SCM B6) consists of the connector for externally connecting to and communicating with an extended System Bus SBUS', 14x which links SCM 13b and the SBUS 14b. Likewise, port 22c (of SCM 13a) connects SBUS to the BEM 2eeb.

The dual operational data processing network 10 of FIG. 3 will be seen to have two complete duplicate systems designated as domain 10a and domain 10b which constitute the overall data processing network. In the network 10, each of the two Central Processing Modules 11 can receive, process, and store data without interference from the other by using their own System Bus 14 and memory bus 16. These two domain busses are designated respectively as SBUS 14a and SBUS 14b, while the memory busses are designated at 16a and 16b. As a result, the network 10 has essentially twice the data processing capability as an individual a single data processing system such as domain 10a or 10b.

The dual domain architecture of FIG. 2 is designated as a first system domain 10a and a second system domain 10b. The bus exchange module 23ea in the first domain 10a, is an agent for the CPM 11b and IOM 12b residing in the second domain 10b, in order to request that the SBUS 14a be made available for access. On the other hand, the Bus Exchange Module BEM 23eb in the second domain 10b is an agent for the CPM 11a and IOM 12a in the first domain 10a, in order to request access to the OSBUS 14b.

Since the bus architecture in the dual architectural system of FIG. 2 is not a single shared bus, it is required that the first Bus Exchange Module BEM 23ea act as an agent for the other requesters, CPM and IOM, in the remote domain (namely, the second domain 10b) in order to request access to the shared resource (SBUS 14a) whenever the requesters in the remote domain (10b) seek to access the requester-receivers in the local domain (10a).

Thus, in the priority allocation system provided herein, the system only need be concerned about the situation where one BEM, one CPM and one IOM seek access to its local bus. The requesters in the other domain (the remote domain) have to handle all the requests through the BEM in order to seek access to the local bus if they ever need to communicate with the requesters in the local domain.

This provides the reason in the present priority allocation scheme, that the Bus Exchange Module BEM is set at the highest priority level in accessing its local bus because it is the agent of all remote requesters. The access requests which were originated from the remote requesters have already spent a time period in the remote domain before they reach the Bus Exchange Module, BEM. Thus, those requests of the BEM must be given first consideration in order to optimize system performance.

The data processing network 10 which is seen made up of the two data processing systems 10a and 10b will be seen to include a three port Bus Expansion Module BEM 23 shown as 23ea for the first domain system, and 23eb for the second domain system. These bus exchange modules (BEMs) are used as interacting connection modules between the two data processing systems 10a and 10b.

Each of the bus exchange modules (BEM) 23ea and 23eb will have three ports identified by the reference numbers 23a, 23b, and 23c, (FIG. 3) where the ports 23a and 23b of each bus exchange module 23 are connected to the ports 22a and 22b of the system control module (SCM) 13a and 13b. Port 23c of the bus exchange module (BEM) 23 is connected to port 22c of the System Control Module (SEM) 13b in the correspondingly opposite data processing system of FIG. 3.

Thus, the data processing domain system such as 10a, is made expandable by the addition of the system 10b to form the system network 10 in a fashion whereby it puts very little overhead into the system network. Particularly the overhead or added cost to the data processing system 10 which makes it expandable, is practically only the cost of one connector 22c, plus the cost of the switch 22d. No overhead or cost in the form of a second System Bus or a 2-1 bus multiplexer is required to be added to the CPM 11, the IOM 12 or the Main Memory MM 15, since they each connect to just a single system bus 14a, and 14b. Further, no overhead is required by the connectors 22a and 22b, since they are used in the network to connect the SBUS 14a and the Memory Bus MBUS 16a in the first domain system and this occurs likewise in the second domain system 10b.

A factor in the present system network is that the network 10 of FIG. 3 can actually be partitioned. Normally, the two data processing systems 10a and 10b will interact through the ports 22a, 22b, 22c and the ports 23a, 23b, 23c to Read and Write to each other's memory and to send messages to each other. However, the two data processing system 10a and 10b can also be electrically partitioned via the SCM 13 and the Bus Exchange Modules BEM 23, such that one of the data processing systems operates on its own, while the other data processing system can be powered down for repairs.

The present dual domain system provides specialized intercommunication capabilities between the modules of the first domain and the modules of the second domain while also allowing each domain to establish its priority arbitration access routines. For example, as seen in FIG. 2, the CPM Module 11a in the first domain, and the CPM Module 11b in the second domain each have respective snoop-invalidation queues which respectively snoop on the SBUS 14a and on the OSBUS 14b. Thus, the snoop-invalidation queues 11iqa and 11iqb will then hold invalidation addresses which can be used for invalidation cycles to invalidate certain addresses in the cache memory modules 18a and 18b.

Further, in FIG. 2, it will be seen that the Bus Exchange Modules, BEM 23, will each have two separate internal queues. Thus, the Bus Exchange Modules BEM 23a and 23b, each will be seen to have a Message Queue, respectively shown 21qa and 21qb. Additionally, each of these BEMs will also have respective Write OP Address Queues seen as 23qa and 23qb, which enable the Write Address OPs on one bus such as 14b (second domain) to be placed upon and sensed by the other bus 14a in the first domain. Thus, the Write OP Address Queue (23qa, 23qb) and the Message Queue 21qa, 21qb in each of the Bus Exchange Modules, BEM 23ea, 23eb, provide for interlinking of information between the bus of the second domain 14b and the bus of the first domain 14a.

As an example of the cross-linking between domains, it will be seen in FIG. 2 that the CPM 11a or the IOM 12a of the first domain may place a Write OP on the SBUS 14a. This Write OP will be placed in the Write OP address queue 23qb, which will then place it onto the OSBUS 14b, whence it can be placed in the Snoop Invalidation Queue 11iqb, in the second domain.

In the other direction, the CPM 11b or the IOM 12b of the second domain, can initiate a Write OP onto the bus OSBUS 14b which then will be placed into the Write OP Address Queue 23qa, which will then pass this information onto the SBUS 14a and thence place the Write address into the Snoop Invalidation Queue 11iqa, of the first domain.

Now, in regard to the Message Queues 21qa and 21qb, the following interlinking operations can occur. The CPM 11b and the IOM 12b of the second domain can pass a message on the OSBUS 14b over into the Message Queue 21qa (of the first domain), which will thence pass it on to the SBUS 14a which can then convey the message to the CPM 11a or the IOM 12a of the first domain.

Similarly, going from the first domain to the second domain, the CPM 11a and the IOM 12a can place a message on to the SBUS 14a which will be conveyed to the second domain BEM 23eb, where it is placed in the Message Queue 21qb. Here then, it is conveyed on to the second domain bus OSBUS 14b and thence to the final target module which may be the CPM 11b, or the IOM 12b which are the final destination modules in the second domain.

Thus, the first domain, while operating to provide the appropriate priority of access to the first domain bus 14a, at the same time provides a Write OP Address Queue 23qa, and a Message Queue 21qa which interlink with the second domain. Then also, the second domain has the bus exchange module BEM 23eb, which provides the Write OP Address Queue 23qb and the Message Queue 21qb which provides an interlinking between the second domain and the first domain busses, while also providing its own individual priority of access arbitration system to the second domain bus.

The following show examples of the various operational factors during the operation of the system. For example, the Central Processing Module 11 in each of the data processing systems 10a and 10b reads data from the memory module 15, which is in its own system domain. In order to do that, the Central Processing Module 11a of system 10a uses the System Bus 14a and Memory Bus 16a in system 10a. Likewise, in the Central Processing Module 11b of the data processing system 10b, the CPM 11b uses the System Bus 14b and Memory Bus 16b of system 10b.

Another example can occur when the Central Processing Module 11a of system 10a performs a Read operation with a Memory Module 15b of system 10b; and at the same time, the Central Processing Module 11b of system 10b performs a Read operation using the Memory Module 15a of system 10a. Another situation occurs wherein the Central Processing Module 11a of system 10a and the Central Processing Module 11b of system 10b both perform a Read operation with the Memory Module 15a of system 10a. Here, the Memory Bus 16a in system 10a requires that the Memory Bus 16a be time-shared while the two Read operations are performed.

Another example is where the Central Processing Module 11a of system 10a performs a Write operation with the Memory Module 15a of the same system. To perform that Write operation, the busses and ports in that domain 10a are used. Additionally, while the Write operation is being performed, the busses and ports are used to spy on the Write operation and to invalidate any entry in the cache 18b of the data processing system 10b, which corresponds to an entry in the Memory Module 15 of system 10a that is being written to. As an example, if the entry at address 12345 is being written in the memory 15a of system 10a, then a message is sent via the busses and ports to the cache 18b of the data processing system 10b, advising that that cache entry having the address 12345 should be invalidated.

Another condition of operation is where the Central Processing Module 11a of system 10a performs a Write operation on the Memory Module 15b of domain system 10b. That particular Write operation is performed by using the busses and ports. However, while that Write operation is being performed, the busses and ports are used to spy on the Write operation and advise the cache 18b of the data processing system 10b, to invalidate any cache entry which corresponds to an entry in the Memory Module 15b that is being written to.

Likewise, for the above illustrated Write operations, there can exist similar operations wherein the Central Processing Module CPM 11b of system 10b initiates the memory Write operation.

Additionally, another factor arises in that each of the so-called "Write" operations illustrated as being initiated by the Central Processing Module CPM 11, can also be initiated by the Input/Output Module (IOM) 12. In these cases, the data appears on the system bus 14 as originated from the Input/Output Module 12, rather than from the Central Processing Module 11.

Another type of operation occurs wherein the I/O Module 12a of system 10a sends a message to the Central Processing Module 11b of system 10b. Such a message transfer could, for example, be initiated by an operator via the keyboard 17b. Likewise and similarly, the Central Processing Module 11a of system 10a can send a message to the Central Processing Module 11b of system 10b. Similarly, each Input/Output Module 12 (12a, 12b) of each of the systems can send a message to the Central Processing Module (11a, 11b) of its own system, or to that of the other system (11b, 11a).

In FIG. 2, it will be seen that the address queue 23qa accumulates Write-addresses and then sends them on to the SBUS 14a which subsequently passes them on to the cache memory 18a for invalidation cycles.

Likewise, the write OP address queue 23qb in the Bus Exchange Module 23eb, accumulates Write-addresses and then sends them on the bus 14b (OSBUS) over to invalidation queue 11iqa of the cache memory 18b for invalidation cycles.

The Write address queue 23qa can "lock-up" the bus 14a when there are long bursts of Writes occurring on the bus 14b. Thus, in order to prevent "locking-up" the bus 14a, the Bus Exchange Module BEM is given "highest priority", but only during the time period while the BEM is being serviced, (that is to say, if there is occurring a request from the CPM 11a or from the IOM 12a,) so that the arbiter 13ra (FIG. 2) will then switch priority to grant those devices with bus access at the next arbitration access period available.

This lock-up-prevention switching operation occurs immediately and quite distinctively from the architecture of the O'Connell reference, U.S. Pat. No. 5,241,532, wherein that system may continuously keep granting access to the Bus Exchange Module until it runs out of its "allocated bandwidth".

The architecture of the present system using the BEM 23ea is designed such that the Write OP address queue 23qa will accumulate "Write-addresses" from the bus 14b. Then when the queue 23qa is "full", it stops accepting more Write-addresses and then proceeds to empty the addresses from queue 23qa on to the bus 14a in order to provide invalidation queue 11iqa with the invalidation cycles for the cache 18a.

After that, it is not necessary to grant access of the bus 14a to the BEM 23a and thus the BEM 23ea can go on accumulating Write addresses in the queue 23qa until it is full again. As a result of this, the system can then switch priority to other lower priority devices for their access on to bus 14a in an immediate fashion, if any of the requester devices need service of the bus.

In summary, the Write OP address queue 23qa in the BEM 23ea helps to reduce the traffic on the bus 14a. Thus, this provides a reason for incorporating the Write OP address queue 23qa into the BEM in the first place. For example, older systems did not have an address queue in the BEM, and thus each time there was a Write operation on the remote bus 14b, this resulted in a immediate single request on the local bus 14a by means of the BEM 23ea, and as a result, this increased the traffic and utilization of the bus 14a to a very high level, thus denying access to other requesters. However, with the provision of the WRITE OP address queue 23qa in the BEM, this is no longer the case.

Programmable priority arbiter systems such as the O'Connell U.S. Pat. No. 5,241,632 use a combination of several different arbitration schemes, including a straight priority scheme, a programmable arbitration system and a rotating priority arbitration scheme. A particular characteristic to the O'Connell architecture, is that it allocates bus bandwidth to the requesters requesting a shared resource (system bus) based on the particularly given priority level of the requester in order to ensure that no one requester can lock out the other devices for an indeterminate time. Further, such a system supports an extended programmable arbitration algorithm whereby a device, which is requesting access to the shared resource (bus) may be granted access to the bus even if it has already used up its allocated share of bandwidth providing there are no other devices requesting access to the bus (shared resource).

However, the functionality in the O'Connell type architecture involves the situation where each particular device DN is allocated a pre-selected number of clock cycles designated NC(DN). Thus, for supposedly maximum efficiency, the number of clock cycles allocated to a particular device, per bus window, is determined as a function of how long in time the particular device DN requires to complete a meaningful or successful bus transaction. On closer inspection it will be seen that this presents a waste of clock cycles for devices DN which involve both very long and very short bus transactions. This is so because these devices must be allocated the number (window) of clock cycles that are large enough for them to complete the longest required bus operations (while shorter bus operations still have to use the long window), but this then wastes an unnecessary number of clock cycles which, on many occasions, are not needed. In the particular architecture and functionality of the present invention, the number of clock cycles allocated to a particular device is done only to the number of actual clock cycles needed. Thus, as soon as a requesting device completes its action on the bus (shared resource), then the "bus window" is counted as "done" or completed, so that "immediate switchover" is done to make the bus available to another requester.

In the type of system presented by the O'Connell reference, there is provided an "allocation period" consisting of a fixed number of bus windows. During one allocation period, all the requesters that are requesting the shared resource (bus) are allocated a bus bandwidth according to a defined algorithm so that they are guaranteed to get, at some particular time, access to the shared bus resource. During this period, the O'Connell arbiter keeps track of the number of bus windows which have been allocated to each of the requesters and compares it to the total number of windows available, this total number available being designated TNWA. Thus, when the "count of bus windows allocated" equals the total number of windows available, TNWA, then this ends the current allocation period and a new one starts.

In the determination of the total number of windows available, the O'Connell TNWA presents some difficulty in the O'Connell invention because it does not take into consideration the type of situation where the shared bus resource has already been granted to a requester, but at the same time, access to the actual target receiving device is "impossible of completion" and denied because the device may be busy. This situation is often referred to here as a "retry condition", which means that the access cycle must be attempted again and again in order to complete the desired transmission of data.

In the "retry condition" it is not simple to choose an allocation period that can accommodate all of the retry operations required. When a retry operation occurs, the total number of windows available in an allocation period (TNWA) runs out very quickly and often nothing would be accomplished in the allocated period. Then starting at the next allocation period, the allocation algorithm is reset from the beginning and thus the retrying requesters, that have not successfully completed their operations, during the last allocation period, will then time out and still be incomplete. In the present system described herein, the arbitration algorithm resets itself every time the arbiter starts arbitrating and takes into account the retry condition.

It may be seen that the O'Connell algorithmic system will thus operate inefficiently during the occasion of retry conditions and will not properly allocate resources. For example, if it is considered that there is a shared bus having three requesting devices D1, D2, and D3. Assuming D1 is at a priority level L1 and has been allocated an allocation cycle NC(1) of five clocks, even though this particular device may have operational cycles that require only two clocks to complete, time wastage will occur. In this situation, it will be seen that three clocks are wasted.

In this example, similarly, if it is supposed the requester devices D2 and D3 are given priority levels of L2 and L3 and each one is allocated as follows—NC(2) given ten clocks and NC(3) given fifteen clocks. Here assuming, that there is an allocation period of five bus windows available (TNWA= 5) and thus requester D1 is allocated two bus windows [NWA(1)=2]; while requester D2 is allocated two windows [NWA(D2)=2]; and then requester D3 is allocated one window, that is to say [NWA(D3=1], then assuming the situation where the following requests are made simultaneously by the requesters D1, D2 and D3,—then the first bus window in the "first allocation" period will operate so that requester D1 will get the first two windows which are the bus window one and bus window two. Then bus windows three and four are allocated to the requester D2. Then bus window five is allocated to requester D3.

Then during the "second allocation" period, the bus windows one and two will go to the requester D1; then the bus windows three and four will go to the requester D2; and then the bus window five will go the requester D3 and each of these requesters will finish their allocation window assuming there were no retry condition.

However, as soon as a "retry condition" occurs, that is to say, a requester is unable to reach or make contact with the target receiving module, then a newly difficult situation occurs as follows.

Here under the O'Connell system, during the first allocation period, the first two bus windows BW1 and BW2 go to the requester D1 which has the priority level L1. Then, bus windows three and four will go to the requester D2 which has the priority level L2. However, at the bus window three, when conditions arise that D2 "cannot complete" its transaction to the target module, then there must be a retry operation which has to occur. This will occur during bus windows three and four after which at bus window five, the device D3 of priority L3 can then receive its allocation window and complete its allocation period.

What may be observed here, is that on the "retry condition" situation, during the "first allocation" periods since there is a retry condition on the device D2, then the device D2 can never complete its operation while its allocated bandwidth (bus windows) is running out. The situation gets worse when the "second allocation" period is entered under the O'Connell algorithm where the algorithm is reset in order to enter a new allocation period. This means that the number of windows used by the device D1 is reset to "0" and then the arbiter will start granting the bus to device D1 again until D1 runs out of its allocated bandwidth, NWA(D1). Thus, the device D2 has suffered another round of delay before it can get an access grant to the bus (shared resource) again and then the device D2 may time itself out and never finish.

This situation can become even more severe if devices of the "same priority level" are seeking access to the shared bus resource and they are awaiting on each other for resource data. In this situation, the O'Connell system will try to rotate priority between these requesting devices D1, D2, D3, but this will finally result in a time out.

Similarly, if we assume a similar situation in the O'Connell algorithm, except that D2 is at the same priority level as D3 and they are all assigned the same number of bus windows, and also that the TNWA is then increased to six bus windows—here again in this situation, on the "first allocation period," after requester D1 is given the first two bus windows, then on the third bus window, the device D2 gets into a situation of retry and then on the fourth bus window, the third requester D3 also gets into a situation of retry and has to wait for D2. Likewise in the "second allocation" period, a similar situation occurs where priority is given to requester D1 for the first two bus windows and for the third bus window, the second requester D2 gets into a situation of retry which hangs up and then also hangs up any allocation to the requester D3.

Thus, it would appear that it is not a good tactic to rotate priority and grant the bus to device D3 when the device D2 is retried because the requester D3 will be retried anyway until after D2 successfully completes the operation. Thus by rotating and granting the bus access to D3, this becomes a waste of bus windows and consumes one window of each allocation period.

There is much uncertainty and difficulty in determining the exact bus width allocation to be given under the O'Connell system. Quite contrarily in the described present system, the guesswork is eliminated and it is not necessary to let the requester D2 suffer a delay in getting its job done, since D2 will be given the chance to retry its operation at least seven times before passing on the granting of access to requester D3. Further, the present system does not need to be concerned about the allocation period running out of available bus windows before the allocation algorithm will be reset.

In the above-described environment of the system network wherein there is contention occurring for the system bus, these contentions can occur on the system bus 14a of the first data processing system domain, or they can occur on the system 14b of the second data processing system domain. Contention can also occur on the interconnecting system bus 14x (FIG. 3). A simplified version of the bus situation described in FIG. 3 is seen in FIG. 2. Here, in FIG. 2 the first data processing system 10a is seen to have a Central Processing Module 11a, an Input/Output Module 12a, a System Control Module 13a and a Bus Exchange Module 23ea all connected to the system bus 14a. Additionally, the Memory Bus 16a connects the Main Memory 15 to the Bus Exchange Module 23ea and the System Control Module 13a.

The same situation in FIG. 2 occurs as was indicated earlier in that the System Bus 14b (OSBUS) connects the Central Processing Module 11b, the Bus Exchange Module 23eb, the System Control Module 13b and the Input/Output Module 12b. Likewise, the Memory Bus 16b connects the Main Memory 15b to the System Control Module 13b into the Bus Exchange Module 23eb. The Bus Exchange Module 23eb is also connected, as seen in FIG. 3, to the System Bus 14a. Likewise, the Bus Exchange Module 23ea is connected to the System Bus 14b (OSBUS).

In FIG. 2, the Bus Exchange Module 23, operates to forward all requests on the System Bus 14a of one system to the System Bus 14b of the other system. Thus, the BEM 23ea will forward data from System Bus 14a over to the System Bus 14b (OSBUS). Likewise, the Bus Exchange Module BEM 23eb, will forward information from the System Bus 14b over to the System Bus 14a and vice-versa.

As seen in FIG. 2, the Central Processing Module 11 will have an invalidation queue 11iq (11iqa, 11iqb). Similarly, the Bus Exchange Module 23 will have a bus exchange data request queue designated 21q (21qa, 21qb).

In essence, the System busses 14a and 14b can be regarded as one overall System Bus, SBUS 14, rather than two separate individual busses. In FIG. 2, it is the System Control Module, SCM 13 which provides the arbiter circuitry which arbitrates requests which will enable the grant of bus access to the system bus 14.

The arbitration circuitry which provides the arbitration algorithms is located in the System Control Module 13 and designated as 13r, which specifically locates arbiter 13ra in the first system domain 10a and arbiter 13rb in the second system domain 10b.

In FIG. 2, the I/O Module, IOM 12 (12a and 12b) processes all the related requests for peripheral devices often designated as I/O devices. The system bus 14 is a shared resource that all of the requesters are competing for. These requesters include the Central Processing Module CPM 11, the Input/Output Module IOM 12 and the Bus Exchange Module 23. Access to the System Bus 14 is regulated by the arbitration circuitry 13r, which resides in the System Control Module 13. The presently disclosed arbitration system and algorithm involves a number of factors which depend upon the operating conditions of the system. The systems method and operation includes the following possible operative factors:

(i) First-Come, First-Serve: Any requester such as CPM 11a, BEM 23ea, IOM 12a, that is requesting the system bus 14a, will be provided access immediately if no other requester is requesting the system bus 14a and the bus is not in the possession of another requester. After being granted access to the bus, the winning module will then "own" the bus for the whole duration until its task is complete. During the period that the bus 14a is owned by a requester, arbitration operations are "blocked" by the arbiter 13r until the common system bus 14a is released for use again. After this, the arbitration operation is resumed.

(ii) Fixed Priority Operation: Since the Bus Exchange Module, BEM 23ea, has the function of forwarding requests on the system bus 14a to other requesters on bus 14b in the opposite system domain, then the Bus Exchange Module 23e is given the highest priority level in order to access the system bus 14. If the system bus 14 is free, and there are two or more requesters requesting it, then requester 23ea (BEM) always gains priority of access to the bus provided there are no pending requests during the whole time period that the shared bus 14 has been owned by a previous winner.

(iii) Rotating Priority: Requesters such as the CPM 11 and the IOM 12 are placed at the "same priority" level and are given access to the system bus 14 on a rotational basis using a round-robin fashion, depending on which requester was last granted the bus access and whether or not that access was successfully completed or got "re-tried".

(iv) Bus Bandwidth Allocation: If a requester such as the CPM 11 or the IOM 12 is granted access to bus (14a, 14b), but the cycle is being "retried" because of an error condition, then that same requester will be granted bus access again for a period of seven times before the arbitration routine will switch bus access to the another requester.

(v) Lockout Prevention: During the time when the system bus (14a, 14b) is in the ownership and possession of a requester, the arbiter 13ra stops all arbitration. However, the individual requesters can still send their requests to ask for access to the bus (14a, 14b). In this case, the arbiter 13r will store all the pending requests in an arbiter queue. Then as soon as the arbiter 30r is allowed to arbitrate again (that is to say the system bus (14a, 14b) is now released from ownership), then the arbitration system reverts to the first-come, first-served scheme. Therefore, even if the Bus Exchange Module 23e, which has the highest priority for bus access, is one of the requesters requesting the bus, it will not be granted access to the bus because there was already a "pending" request while the bus was in use.

Figure 4A:
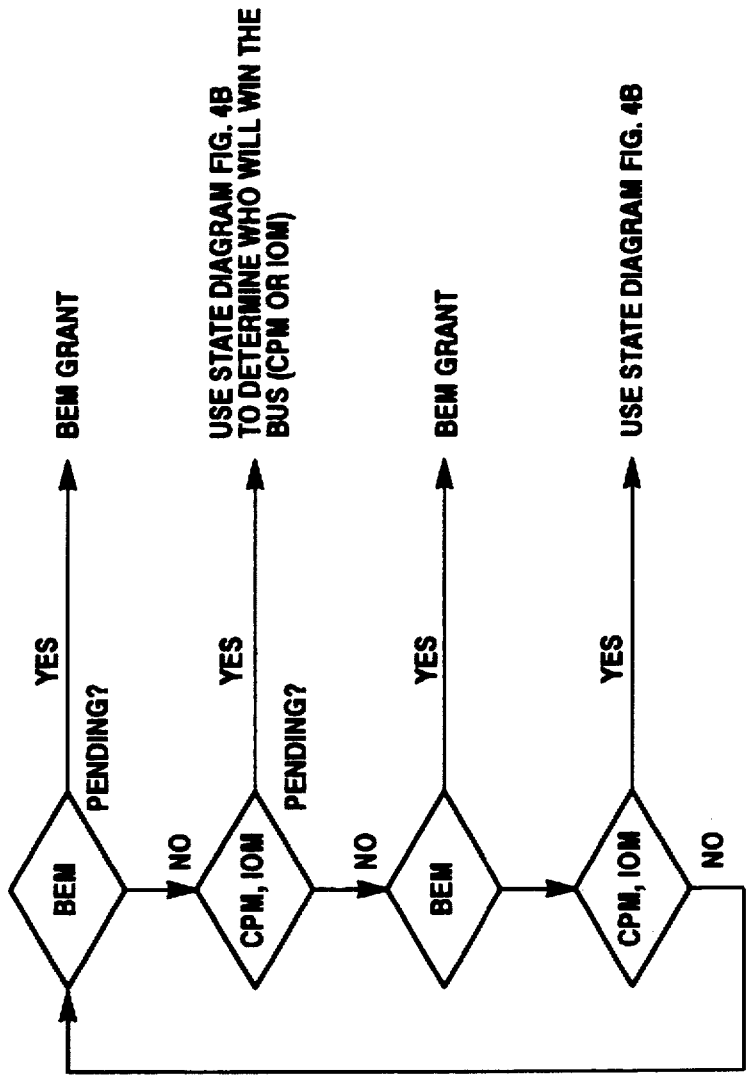
FIG. 4A is a simplified chart of the arbitration mode results.

FIG. 4A is a simplified overview of the algorithm for determining priority of bus access to system bus 14. Here, when the BEM 23e makes a request which had already been pending (YES), then the arbiter 13r 14 is granted access to the BEM, Bus Exchange Module 23e. If the Bus Exchange Module "did not" have a pending request for bus access, but the CPM 11 or the IOM 12 had a request pending, then by the state diagram of FIG. 4B shows which requester module will win access to the bus.

If neither the Central Processing Module 11 or the Input/Output Module 12 has a request pending, then a request by the Bus Exchange Module 23e will be immediately granted access priority to the system bus (14a, 14b). Likewise, when the Central Processing Module 11 or the Input/Output Module 12 requests access to the system bus (14a, 14b), then access is granted according to the state diagram of arbiter states indicated in FIG. 4B.

Figure 4B:
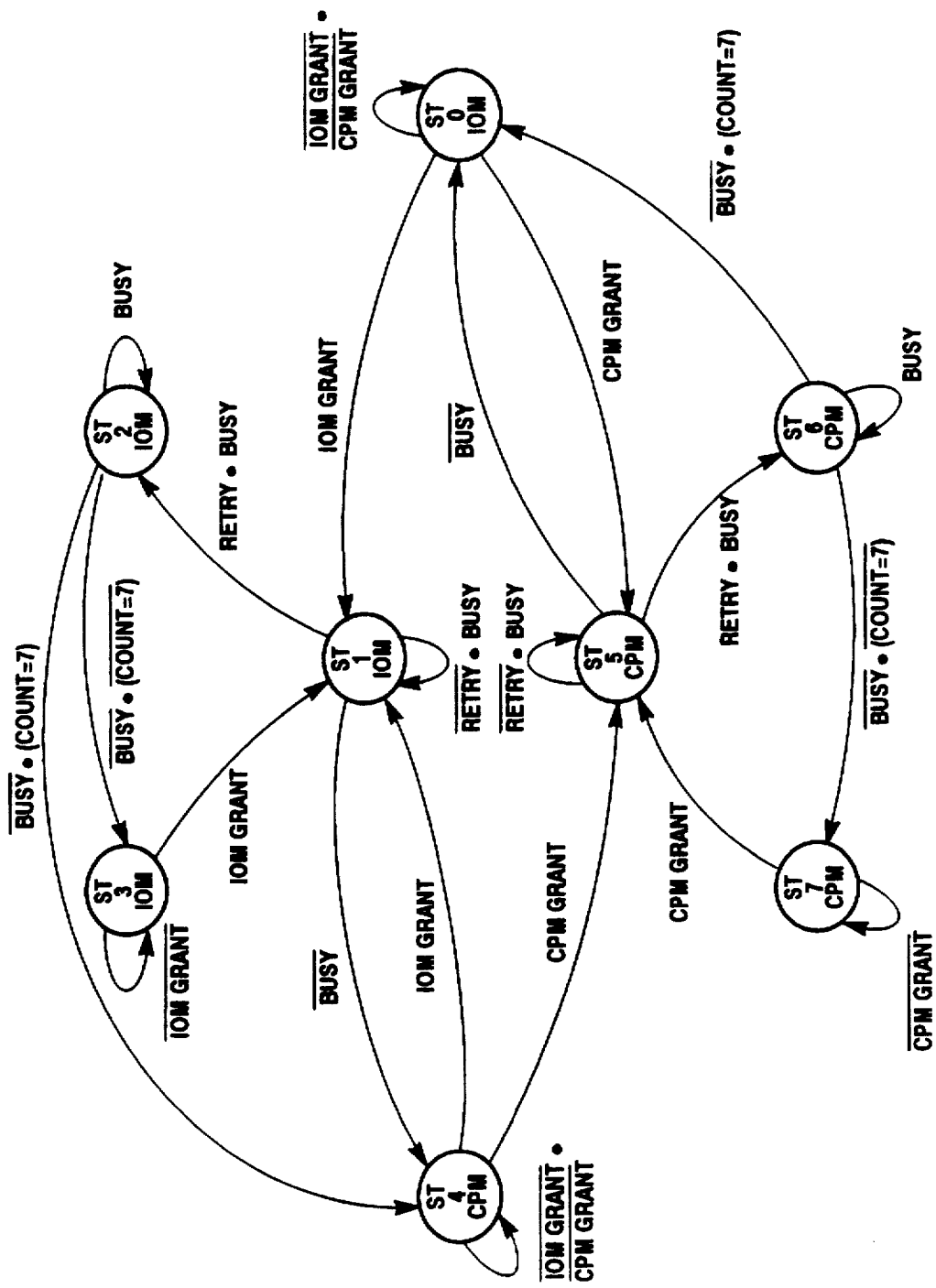
FIG. 4B is a state diagram illustrating the various states of the arbitration modes for system bus access.

The state diagram of FIG. 4B is a illustration of the arbitration system in operation as between the Central Processing Module devices 11 and the Input/Output Module devices 12 seen in FIG. 2. Thus, the two devices designated as the CPM 11 and the IOM 12 are placed at the same priority level. If they both "simultaneously" request access to the system bus 14, then they are rotationally granted access to the system, bus provided that the last device module which had won the bus had successfully completed its task. However, if the task was incomplete and had been retried due to unavailability of the receiving device, then the last winner of the bus would allocated seven more times to gain access to the bus and to finish the task, before the priority of bus access is switched to the other requesting device (CPM or IOM).

As an example, starting with state "0" in FIG. 4B , the IOM device 12 has priority over the CPM 11 if they both simultaneously request access to the bus 14. Otherwise then, a first-come, first-served scheme is used for a single request. If it is supposed that the IOM 12 requests the bus and is granted access, then the system transits to state 1. In this state, if the system bus 14 is "busy", for example, and the bus is already in possession by the IOM 12 and the arbiter 13r has stopped all arbitration, and there is no retry signal asserted, then the system will stay in this particular state awaiting for either condition of (i) bus busy deactivated or (ii) retry asserted, to occur.

If the "bus busy" signal is dropped, (Busy) and draw a straight line over the entire word then the system transits to state number 4 and the arbiter 13r resumes arbitration again. In state number 4, priority is now "rotated" to the CPM 11 because the module IOM 12 was the last device to win the bus and has successfully completed its task, that is to say, no retries are pending.

In FIG. 4B at the state number 1, if the retry signal is asserted while the system bus 14 is still busy, then the system will transit to state 2 to wait for the busy signal to go away. Here, a counter is used to count the number of retries. When the busy signal goes away, the system checks the counter to see whether this requester has been retried for seven times. If this is "not" the case, then the system transits to state 3 and grants access to IOM 12 again, when the IOM device module retries its request. When the grant to the IOM 12 does occur, the system transits to state 1 and stays in the loop (state 1—state 2—state 3) until the counter counts seven retries. Then the IOM 12 runs out of its allocated bus time and the system will transit to state number 4, where now the CPM 11 has priority over the IOM 12.

In FIG. 4B, the lower half of the state diagram (state 4, 5, 6, 7, 0) behaves exactly as its upper half counterpart. These states are used to keep track of requests from the CPM 11 and its retry status. The CPM will be allocated a maximum of seven bus ownership periods before rotating the priority of bus access to the IOM 12. In the situation where the bus exchange module, BEM 23e, has a higher priority level than both the CPM 11 and the IOM 12, and it is considered that the BEM 23e is granted access to the bus and while the BEM owns the bus and both the CPM 11 or IOM 12 are both requesting the bus, then here, the bus request signals are stored in BEM message queue 21q (21qa, 21qb), and as soon as the particular BEM 23e releases the bus, then both of the device modules CPM 11 and IOM 12 start the arbitration process under control of the arbiter 13r. Which device will get the first grant of access to the bus 14, depends on the state that is operated on in the state diagram of FIG. 4B which in this case, is either state "0" or state "4" only.

Figure 1A:
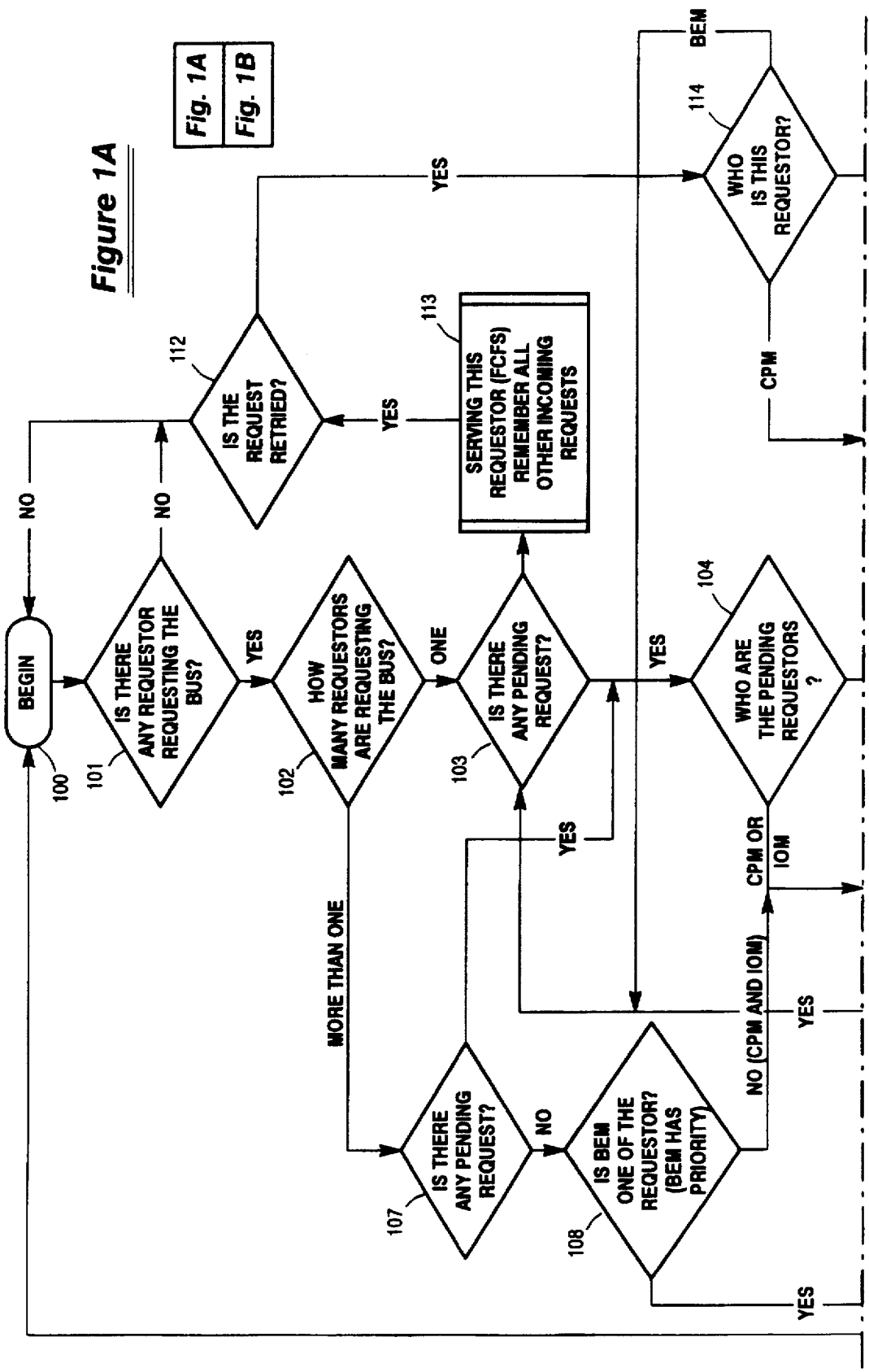
FIG. 1 is a flow diagram illustrating the various conditions and modes handled by the present algorithmic arbitration system.
Figure 1B:
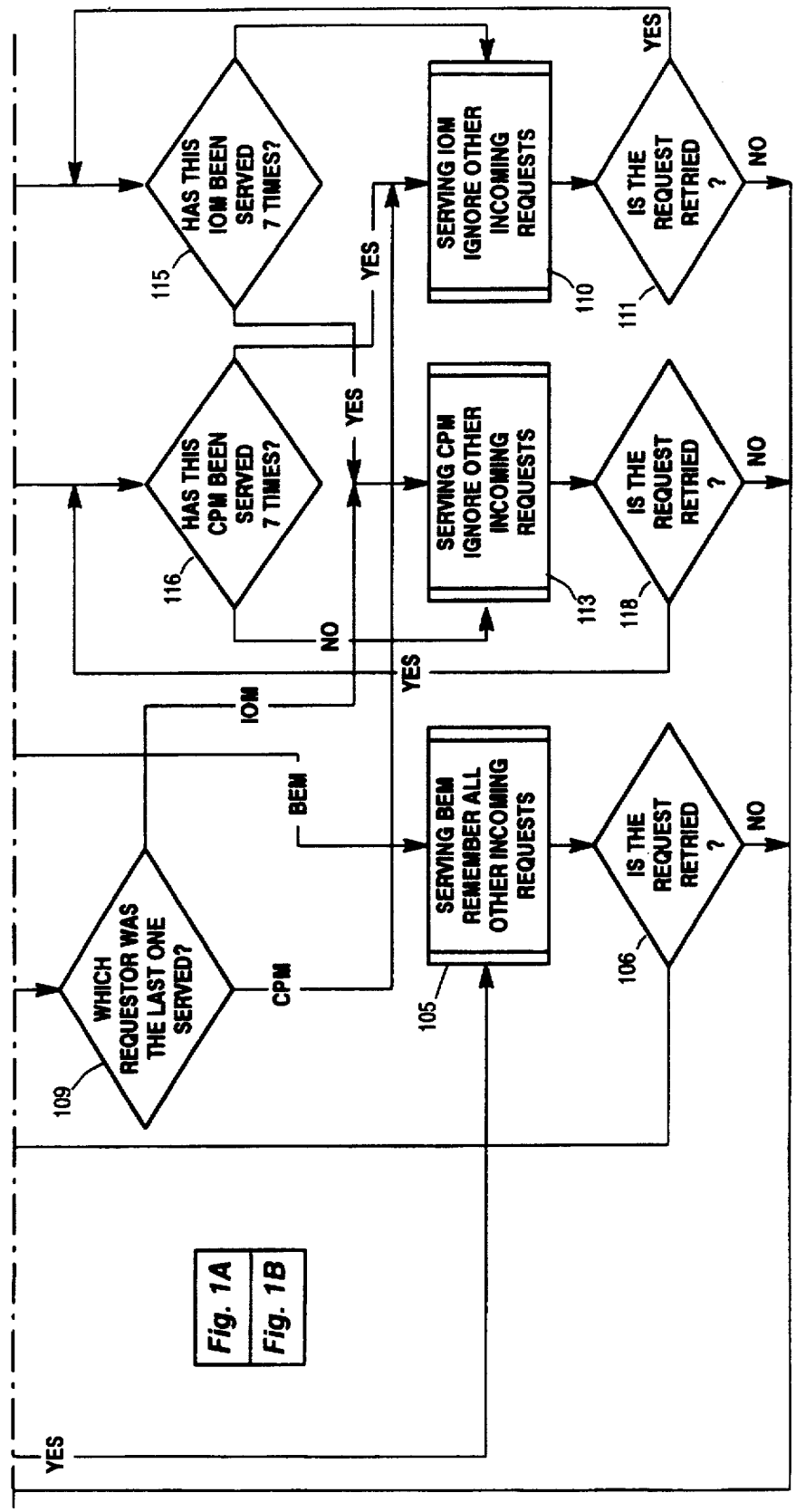

FIG. 1 is a flow chart illustrating the features of the present system in regard to methods of arbitration for handling the various operational conditions.

The procedure begins at marker 100, whereupon at marker 101, the decision point occurs as to the question of "is there any requester requesting the system bus 14?" If this is a (YES), then at marker 102, the decision point arises "how many requesters are requesting the bus?" If only one requester is requesting the bus, then at marker 103, the system queries if there is any pending request. If there is no pending request, then at marker 113, the system operates under the first-come, first-served scheme which then remembers or lists all the other incoming requests and then checks at marker 112 to see "is the request being retried?" If it is not being retried, then the system goes back to marker 100 to begin again.

At marker 102, if there is more than one requester requesting the bus, then the query arises at marker 107 as to whether "is there any pending request?" If there is no pending request, then at marker 108, the decision is made whether the Bus Exchange Module BEM is one of the requesters, since it has priority. If the BEM is one of the requesters (YES), then the system moves to marker 105 to serve the BEM for immediate access to the system bus, 14, while also remembering all other incoming requests, after which at marker 106, the query arises "is the request being retried?" If this is a (NO) then the system reverts to marker 100 to begin. If this is a (YES) the system reverts to marker 103 to ask if there is a pending request.

At marker 108, if the Bus Exchange Module, BEM, 23e is "not" one of the requesters, then the system moves to marker 104 to query "who are the requesters?", that is to say, whether this is a request by the CPM 11, or the IOM 12. At marker 109, the system queries "which requester was the last one served?" If the IOM 12 was the last one served, then the system moves to marker 115 (was IOM served seven times?) or else to marker 117 which gives access to the CPM 11 and ignores other incoming requests. The system then moves to the marker 118 to check whether the request has been retried. If this is a (YES), then the system reverts to markers 116 (CPM-7 retries) and 114 to 117 (IOM-7 retries). If (NO) at marker 11B, then the system reverts to marker 100 to begin.

At marker 109, if the last served requester was the IOM, the arbiter system moves to marker 115 to check if the IOM has completed its task within the seven allocated retries and then access is given to the IOM at marker 110 (not been served seven times).

If, at marker 115, the IOM has "used its seven retries," then (YES) at marker 117, will provide next access to the CPM (rotating priority).

At marker 114, if the requester is the BEM (YES), the marker 103 and 104 gives access to the BEM which also via markers 105, 106 is given retries to complete its task.

At marker 114, if the requester is the CPM, (not served 7 times) the marker 116 allocates up to seven retries via marker 117 and 118. If marker 116 indicates expiration of the seven retries by the CPM, then Marker 110 indicates that then the IOM will get bus access.

Thus, the system has been especially tuned for the arbitration operation under different sets of conditions to ensure that the most efficient use of the involved modules is being effectuated. As a result, there are certain operations which provide a "first-come, first-served" bus access, while in other situations, the system provides a fixed priority of access, and in other situations, provides a rotating priority of access. Further, certain extra bandwidth allocation to the system bus is provided by enabling seven retries before switching to another requester, and additionally, there is a prevention of lockout, since during the time when the system bus is being used and owned, the arbiter 30r will stop all arbitration.

Described herein has been a self-adjusting bus priority allocation system for a dual domain processing network wherein a Bus Exchange Module (BEM) in each domain, links the two domains via common system busses and also is given first level priority for bus access in each domain. Each BEM holds a Message Queue for messages to be transmitted between domains, and each BEM has a Write OP address queue for hold Write OP addresses to be transmitted between domains for settlement in special invalidation queues in each of the first and second domain CPM's invalidation queues for invalidation cycles in their associated cache memory units. Other modules on the common bus such as the Central Processing Module (CPM) and Input/Output Module (IOM) get first-come-first-served priority if the BEM is not in contention for access while any requester (BEM, CPM, IOM) is also allowed up to 7 retry chances for bus access to complete an incompleted data transfer cycle which was initiated but remained incomplete. The priority allocation scheme also prevents bus lock ups and prevents the "starving-out" of any requester modules in the system network.

While one preferred embodiment of the described invention has been illustrated, it should be understood that other embodiments may involve the concept of the attached claims.

What is claimed is:

1. A data processing network linking two separate first local and second remote data processing systems for enabling the transmission of Read/Write commands and messages between sending/receiving modules within each first local or each second remote data processing system or between modules of said first local and second remote data processing systems, said network comprising:

(a) a first local data processing system and second remote data processing system, each said system including:

(a1) a common system bus means;

(a2) a Central Processing Module (CPM), an Input/Output module (IOM), a Bus Exchange Module (BEM), and System Control Module (SCM), each of which is connected to said common system bus means;

(a3) said Central Processing Module (CPM) having a cache memory means and an invalidation register queue for holding addresses of bus Write OPs which are to be invalidated in said cache memory means;

(a4) said bus exchange module (BEM) having (i) a message queue for holding multiple numbers of messages being transmitted between said first local system and said second remote system, and (ii) a snoop-Write address queue for storing Write OP addresses snooped from said common system bus means for subsequent passage to said invalidation register queue;

(a5) said system control module (SCM) including an arbiter means for selectively regulating access priority to said common system bus means for bus access requests from said CPM, IOM and BEM, said arbiter means including:

(i) means for granting first priority of a bus access to said BEM when it has a pending request to said common system bus means;

(ii) means for granting second priority of bus access to said IOM if the CPM was the last module served with access to said common system bus means;

(iii) means for granting second priority of bus access to said CPM if the IOM was the last module served with access to said common system bus means;

(iv) means, when said BEM, CPM and IOM are simultaneously contending for access to said common system bus means, to grant bus access priority first to said BEM and then grant second priority of bus access to said CPM and IOM according to which module did not have the last system bus access;

(v) means for delaying the assertion of priority by each of said BEM's until the BEM has completely filled its message queue or its write address queue.

2. The network of claim 1 wherein said first local system BEM's message queue holds message information received from said first local data processing systems CPM/IOM for transfer to said second remote data processing system's IOM/CPM via said second remote data processing systems common system bus means.

3. The network of claim 2 wherein said second remote data processing system's BEM message queue holds message information received from said second remote data processing systems CPM/IOM for transfer to said first local data processing systems IOM/CPM via said first local data processing system's common system bus means.

4. The network of claim 1 wherein said second remote data processing system's BEM snoop-Write address queue includes:

(a) means to sense, copy and store a multiple number of Write addresses which have appeared on said second remote data processing system's remote common system bus means;

(b) means to transmit said copied Write addresses to said first local data processing system's CPM invalidation queue via said first local data processing system's common bus means;

(c) means to flush out addresses accumulated in each said BEM when the said BEM's Snoop-Write address queue is filled to capacity;

(d) means to flush out addresses accumulated in said invalidation queue to prevent any access of stale data in said cache memory means of said CPM.

5. The network of claim 4 wherein said first local data processing system's BEM's snoop-Write address queue includes:

(a) means to sense, copy and store multiple numbers of Write addresses which have appeared on said first local data processing system's common system bus means;

(b) means to transmit said copied Write addresses to said second remote data processing system's CPM invalidation queue via said second remote data processing system's common system bus means.

6. The network of claim 1 wherein said arbiter means further includes:

(a) means for sensing when a sending CPM, IOM, BEM module still has an incomplete sending cycle to a receiving module;

(b) means to allocate "X" retry access cycles to said incomplete sending module before granting system bus access priority to another sending module.

7. The network of claim 6 wherein X constitutes 7 retry access cycles.

8. A network linking first and second data processing means for enabling efficient data transfer operations between sending and receiving modules located within the domain of each said first and second data processing means or sending and receiving modules located in different domains of said network, said network comprising:

(a) first and second common system bus means;

(b) a first and second central processing module (CPM), each holding a cache memory and invalidation queue, a first and second Input/Output Module (IOM), and a first and second Bus Exchange Module (BEM), each said first and second CPM, IOM, BEM modules respectively connected to said first and second common system bus means and each said CPM, IOM, BEM modules acting as a bus access requester to transmit data on said common system bus means;

(c) a first and second System Control Module (SCM) each holding a first and second bus access arbitration means for determining bus access priority for said requesters;

(d) said first and second Bus Exchange Modules (BEM) connected to both said first and second common system bus means, each said BEM including:

(d1) message register queue means for holding multiple numbers of message data transmitted between modules of said first and second data processing systems;

(d2) snoop-Write address register queue means for copying and storing a multiple number of Write addresses from said common system bus means, including:

(d2a) means to convey said copied Write addresses to the said invalidation queue of the CPM in the opposite data processing system.

9. The network of claim 8 wherein each said first and second bus arbitration means includes:

(a) means for granting first priority of bus access to said BEM when it is requesting bus access;

(b) means for allocating bus access priority on a first-come, first-served basis until two requesting modules concurrently request bus access;

(c) means for allocating bus access priority using a toggling sequence between said IOM and said CPM when they are concurrently requesting bus access.

10. The network of claim 9 wherein each of said bus arbitration means includes:

(a) means for granting a temporary second level priority, subordinate to said BEM, when said sending CPM or said sending IOM have an incomplete sending cycle to a receiving modules said second level priority being effective only for a set number "XX" of retry cycles.

11. In a network linking first and second computer systems each of which have a first and second common bus means connecting requester modules and a system control module, a system for coupling said first and second computer systems for data transfers while preventing deadlock and starvation of any requester, comprising:

(a) said first computer system having a first common system bus means connecting a first system control module having a first arbiter state machine means, and a plurality of requester modules, said requester modules including:

(i) a first central processing module (CPM) having a invalidation queue within and connected to a first cache memory module;

(ii) a first input/output module (IOM) for connecting peripheral devices to said first computer system;

(iii) a first bus exchange module (BEM) connecting to said first and second common system bus means, said first bus exchange module including:

(a) a first message queue for temporary storage of a multiplicity of messages being transferred from said first computer system to said second computer system;

(b) a first Write address register queue for holding a multiplicity of addresses snooped from said second common system bus means for subsequent transfer to said first invalidation queue of said first CPM via said first common system bus means;

(b) said second computer system having a second common system bus means connecting a second system control module having a second arbiter state machine means, and a plurality of requester modules, said requester modules including:

(i) second central processing module (CPM) having a second invalidation queue and connected to a second cache memory means;

(ii) a second input/output module (IOM) connecting external peripheral devices to said second computer system;

(iii) a second bus exchange module (BEM) including:

(a) a second message queue for holding a multiplicity of messages received from said second common system bus means for transfer to said first common system bus means;

(iv) a second Write address register queue for holding a multiplicity of Write addresses snooped from said first common system bus for subsequent transfer to said second invalidation queue of said second CPM via said second common system bus means;

(c) said first and second arbiter state machine means each including selective priority access algorithms for determining priority of access to each of said first and second common system bus means by said respective first and second CPM's, IOM's and BEM's, each said selective priority access algorithms including:

(c1) means for selectively regulating the priority of access among said BEM's, said IOM's, and said CPM's, in order to prevent any deadlock condition from occurring and to prevent any requesting module from being starved out of access to said common system bus means;

(c2) means for limiting the number of retry cycles for any requester module having an incomplete transfer operation to enable bus access for other concurrent requester modules.

12. The system of claim 11 where each said bus exchange module's (BEMs) message queue and write address register queue allow the buffering of data being transmitted, thus to alleviate the pressure of the BEM continually asserting its higher priority over said CPMs and said IOMS.

13. The system of claim 11 where each said message queue and write address queue of each BEM permit loading of multiple numbers of data before said BEM is required to assert its higher priority for bus access thus enabling a greater fairness of access to said IOMs and CPMs.

* * * * *